US006745308B2

(12) United States Patent
Frank et al.

(10) Patent No.: US 6,745,308 B2
(45) Date of Patent: Jun. 1, 2004

(54) METHOD AND SYSTEM FOR BYPASSING MEMORY CONTROLLER COMPONENTS

(75) Inventors: Michael Frank, Sunnyvale, CA (US); Santiago Fernandez-Gomez, Menlo Park, CA (US); Robert W. Laker, Fremont, CA (US); Aki Niimura, Sunnyvale, CA (US)

(73) Assignee: ATI Technologies, Inc., Thornhill (CA)

( * ) Notice: Subject to any disclaimer, the term of this patent is extended or adjusted under 35 U.S.C. 154(b) by 278 days.

(21) Appl. No.: 10/078,821

(22) Filed: Feb. 19, 2002

(65) Prior Publication Data

US 2003/0159013 A1 Aug. 21, 2003

(51) Int. Cl.[7] ............................................... G06F 12/00
(52) U.S. Cl. ...................... 711/169; 711/138; 711/150; 711/167; 711/168; 711/213; 712/233; 712/237
(58) Field of Search ................... 711/150, 138, 711/167–169, 213; 712/233, 237

(56) References Cited

U.S. PATENT DOCUMENTS

| | | | | |
|---|---|---|---|---|
| 5,317,720 A | * | 5/1994 | Stamm et al. ............... | 711/143 |
| 5,371,874 A | * | 12/1994 | Chinnaswamy et al. .... | 711/141 |
| 5,717,882 A | * | 2/1998 | Abramson et al. .......... | 712/217 |
| 5,890,219 A | * | 3/1999 | Scaringella et al. ........ | 711/162 |
| 6,006,296 A | * | 12/1999 | Gold et al. .................. | 710/100 |
| 6,253,276 B1 | * | 6/2001 | Jeddeloh ...................... | 711/5 |
| 6,366,992 B2 | * | 4/2002 | Manning ..................... | 711/167 |

OTHER PUBLICATIONS

Hiraki et al, "Stage–Skip Pipeline: A low Power Processor Architecture Using a Decoded Instruction Buffer", Low Power Electronics and Design, 1996. International Symposium on. pp. 353–358.*

Abnous et al, "Pipelining and bypassing in a VLIW processor", Parallel and Distributed Systems, IEEE Transaction. 1994. pp. 658–664.*

Ahuja et al, "The performance impact of incomplete bypassing processor pipelines", Microarchitecture, 1995. Proceedings of the 28th International Symposium on. pp. 36–45.*

* cited by examiner

*Primary Examiner*—T. Nguyen
(74) *Attorney, Agent, or Firm*—Toler, Larson & Abel, LLP

(57) ABSTRACT

A method and system are shown for bypassing memory controller components when processing memory requests. A memory controller analyzes internal components to determine if any pending memory requests exist. If particular memory controller components are idle, a memory client is informed that a bypassing of memory controller components is possible. A bypass module of the memory controller receives memory requests from the memory client. The bypass module examines memory controller parameters and a configuration of main memory to determine which memory controller components may be bypassed and routes the memory request accordingly. In a system with asynchronous memory, the memory controller provides copies of the memory request through a dual pipeline. A first copy of the memory request is processed through a bypass module to attempt to bypass memory controller components. A second copy of the memory request is processed in a normal fashion in case a bypass of the memory access request is not possible. If the bypass is possible, the second memory request is cancelled.

39 Claims, 6 Drawing Sheets

METHOD AND SYSTEM FOR BYPASSING MEMORY CONTROLLER COMPONENTS

FIELD OF THE DISCLOSURE

The present invention relates generally to memory and more particularly to handling memory requests.

BACKGROUND

The more components of the memory controller used, the deeper a pipeline for processing a memory request is considered. Deeper processing pipelines are associated with more latency due to the added processing used to propagate memory requests through the processing pipeline. Read requests to access data from RAM are generally processed through a deep processing pipeline of the memory controller. Memory controller components that make up the processing pipeline are used to handle requests from various clients. The memory controller components organize memory requests to deal with request dependencies, in which some memory requests are to be processed before others. The components also prioritize some memory requests over others. However, to reduce the amount of time taken in processing, some memory controller components may be bypassed.

Bypassing memory controller components to reduce latency is known. However, clients must be provided with a large amount of information. Clients are provided information to decide whether or not to bypass various memory controller components. Various operating parameters of the memory controller components usually need to be known in order to allow the components to be bypassed by a particular client. Only components that are idle or have no other memory requests to process may be bypassed. A client is generally provided with information regarding the memory being accessed, particular pages, which are currently open, physical addresses and memory configurations. Memory controller systems provide clients with enough information regarding particular memory configurations and the status of the memory controller components before the client may decide to allow a particular memory request to be bypassed. The need to transfer such a large amount of information reduces the efficiency with memory request bypassing since the information is transferred to the client for every request to be bypassed. This problem becomes further complicated when the memory controller includes asynchronous components, such as due to memory using a separate clock. From the above discussion it should be apparent that an improved method is needed for providing bypassing for memory requests.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

At least one embodiment of the present invention provides for a method of bypassing memory controller components. The method includes receiving a first memory request to read data from memory. In one embodiment, a bus interface unit receives the first memory request. The first memory request may be associated with a cache fetch request. The method includes determining if a first component and a second component of a memory controller are idle. The first component is a Northbridge client interface used to organize received memory requests. The second component is a Northbridge arbiter used to arbitrate, or select, requests from different clients, allowing received requests from all the clients to be processed. The result of determining if the first and second components are idle is provided as a signal to the host bus interface unit. The method also includes providing the first memory request to the first component, when the first component and the second component are busy. The method also includes determining, in the memory controller, if the first memory request is valid for access by bypassing the second component. In one embodiment the second component is used to generate commands to open closed pages of memory. If the memory request needs to access a closed page of memory, the memory request is considered invalid. The method also includes enabling the first memory request to be accessed by the second component, when the first memory request is considered invalid for bypass operations. The method further includes enabling the first memory request to be accessed by the first and second components, when the first memory request is considered valid.

Figure 1:
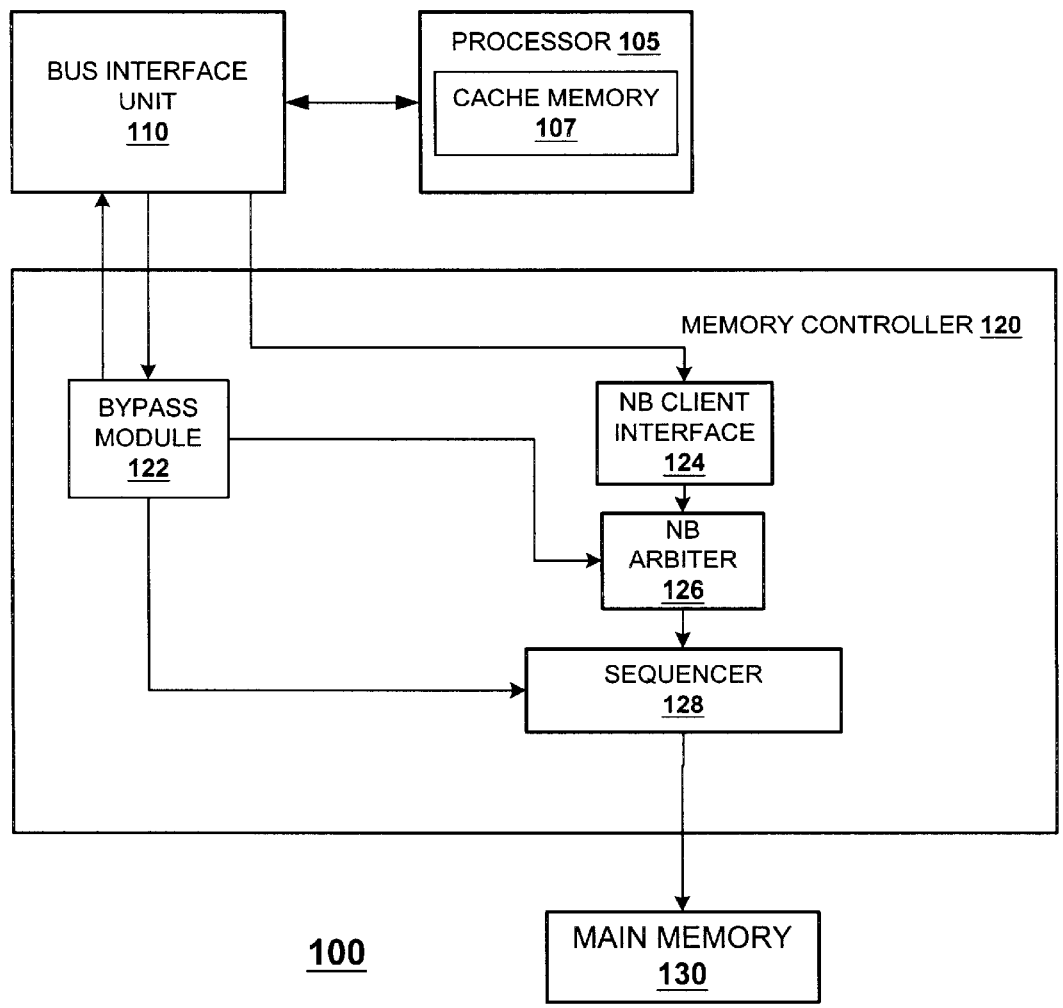
FIG. 1 is a block diagram illustrating a system for processing memory requests by bypassing memory controller components, according to one embodiment of the present invention.

Referring now to FIG. 1, a block diagram illustrating a system for processing memory requests by bypassing memory controller components is shown and generally referenced as system 100, according to one embodiment of the present invention. A memory controller 120 provides information to memory clients regarding idle components of memory controller 120. Such memory clients may include, but are not limited to a bus interface unit 110. A memory client, such as the bus interface unit 110, uses the information to decide whether to send memory requests to a Northbridge (NB) client interface 124 for normal processing, or to a bypass module 122 for processing. If the memory request is sent for processing through bypass module 122, bypass module 122 determines the best way to bypass the memory request.

In one embodiment, bus interface unit 110 is connected to a processor 105 and cache memory 107. Cache memory 107 is primarily used for providing a local memory which processor 105 may use to read data faster than reading data from main memory 130. Cache memory 107 provides a representation of at least a portion of data stored in main memory 130. To provide an adequate representation of data in main memory 130, cache memory 107 occasionally needs to be synchronized to main memory 130. To make cache memory 107 coherent with main memory 130, bus interface unit 110 generates a cache fetch request in the form of a memory read request, requesting data to be read from main memory 130. Data returned from main memory 130 may then be used to update cache memory 107. Processor 105 may include a system processor for general processes of system 100 or a specialized processor, such as a graphics processor used to handle graphics and video processes.

Memory controller 120 provides bus interface unit 110 with information regarding the status of components of memory controller 120, such as a NB client interface 124 and a NB arbiter 126. Dependent on a signal provided by memory controller 120 indicating if memory controller components 124 and 126 are idle, bus interface unit 110 may assume at least a first memory controller component, such as NB client interface 124, may be bypassed and passes the memory request to a bypass module 122. If the signal provided by memory controller 120 indicates NB client interface 124 is not idle, the memory request is passed to NB client interface 124 for normal processing. In one embodiment, bypass module 122 checks to see if any pending memory requests are present in NB client interface 124 and NB arbiter 126 to determine if NB client interface 124 and NB arbiter 126 are busy. While conventional systems provided the client, such as bus interface unit 110, with a large amount of information regarding various operating parameters of the memory controller to allow the client to decide how to bypass memory requests, the present invention allows the memory controller 120 to decide how the majority of bypassing is performed. In at least one embodiment of the present disclosure, only a simple enable signal is sent to bus interface unit 110 to allow bypassing. A bypass module 122 of memory controller 120 handles the final decision regarding whether to bypass a memory controller component in order to process a particular memory request. Accordingly a need to transfer a large set of status information between memory controller 120 and bus interface unit 110 is eliminated or reduced, allowing bypass processing to be handled more efficiently.

Memory controller 120 is used to handle memory requests from clients and memory client controllers, such as bus interface unit 110. Memory controller 120 uses a set of components, such as bypass module 122, NB client interface 124, NB arbiter 126 and sequencer 128 for handling memory requests to main memory 130. In one embodiment, NB client interface 124 is responsible for scheduling read and write memory requests to main memory 130. NB client interface 124 evaluates any dependencies a particular read or write memory request may have. For example, a particular read request may necessarily follow a particular write request. The write request would have to be processed before the read request. NB client interface 124 waits for any dependencies to be resolved, and routes memory requests accordingly. In one embodiment, NB client interface 124 also performs translations from a virtual address provided by bus interface unit 110 to a physical address indicating a bank, row, and column address specific to main memory 130. In one embodiment, NB client interface operates 124 similar to an Advanced Micro Devices Memory Request Organizer (MRO).

NB arbiter 126 receives the requests in an order generated through NB client interface 124. NB arbiter 330 arbitrates received requests among the different memory requesters, such as different PCI clients or bus interface unit 340. In one embodiment, NB arbiter 126 selects requests from each of the requesters using an arbitration algorithm that optimizes access to memory. NB arbiter 126 may be used to generate commands for memory controller 120 to open particular memory pages of main memory 130, dependent on memory regions that are accessed by the received memory requests. Alternatively, NB arbiter 126 may select requests in a round robin manner, selecting one request from each requester in a defined order. In one embodiment, NB arbiter 126 operates similar to an Advanced Micro Devices Memory Request Arbiter (MRA).

A sequencer 128 stores memory requests received from NB arbiter 126 or bypass module 122. In one embodiment, the memory requests are placed on a queue (not shown) for output to main memory 130. Memory requests may simply be placed on the queue in a first-in-first-out configuration, wherein a newly received memory request is placed on top of the latest memory request in the queue. In one embodiment, page hit requests form an exception, in which page hit requests, which request data from a memory page already open, are placed ahead of any page-miss requests, but behind older page-hit requests. In one embodiment, memory requests stored by sequencer 128 include an address of main memory 130 to access, a data size requested, and any other information, such as dependency flags used to mark unresolved dependency issues. The memory requests that are at the bottom of a queue in sequencer 128 are passed to main memory 130 for processing. In one embodiment, main memory includes random access memory (RAM), such as dynamic RAM or static-dynamic RAM. It should be noted that other forms of memory may be used without departing from the scope of the present invention.

Bypass module 122 handles bypass processing of memory requests from clients, such as through bus interface unit 110. In one embodiment, bypass module 122 observes the status of NB client interface 124 and NB arbiter 126 to determine whether or not to enable bypassing for bus interface unit 110. If NB client interface 124 and NB arbiter 126 are idle, bypass module 122 sends a signal to bus interface unit 110 to enable bypassing. Memory request queues (not shown) associated with NB client interface 124 and NB arbiter 126 may be analyzed to determine if NB client interface 124 and NB arbiter 126 have any requests to process. Read and write pointers associated with the memory request queues can be compared to determine if the memory request queues are empty.

NB client interface 124 and NB arbiter 126 are used to primarily arrange an order for processing memory requests. Most of the work by NB client interface 124 and NB arbiter 126 is performed with a plurality of pending memory requests. NB client interface 124 and NB arbiter 126 are generally inefficient with only a single memory request. When only a single memory request is pending, NB client interface 124 and NB arbiter 126 do not need to rearrange the order in which the single memory request is processed. Accordingly, most of the scheduling normally performed by NB client interface 124 and NB arbiter 126 can be skipped, or bypassed. If bypassing is enabled, bypass module 122 receives memory requests from bus interface unit 110. In one embodiment, bypass module 122 performs address translation normally performed by NB client interface 124.

Once bypass module 122 receives a memory request for bypass processing from bus interface unit 110, bypass module 122 further examines the status of components of memory controller 120. In one embodiment, bypass module observes idleness associated with sequencer 128. If sequencer 128 is currently busy, bypass module 122 passes the memory request to NB arbiter 126 to allow the memory request to be queued into sequencer 128 through NB arbiter 126.

Bypass module 122 may also observe open memory pages to determine whether to use bypass processing for received memory requests. In one embodiment, bypass module 122 compares a list of currently open pages of main memory 130. If a page associated with a received memory request is to be opened, bypass module 122 passes the memory request to NB arbiter 126. NB arbiter 126 may then be used to generate commands to open the particular page and provide the memory request to sequencer 128. Alternatively, if the page requested is currently open and sequencer 128 is not busy processing other commands, bypass module 122 passes the memory request to a final stage of the queue in sequencer 128, allowing the memory request to be passed to main memory 130. Other parameters of components 124, 126 and 128 may also be analyzed to determine how to handle memory request bypasses. While reference has been made to memory requests from a host bus interface unit 110, it should be appreciated that memory requests from other clients may also be considered for bypass processing, such as PCI clients or AGP clients, without departing from the scope of the present invention. It should be appreciated that other suitable components of memory controller 120 may also be included.

Figure 2:
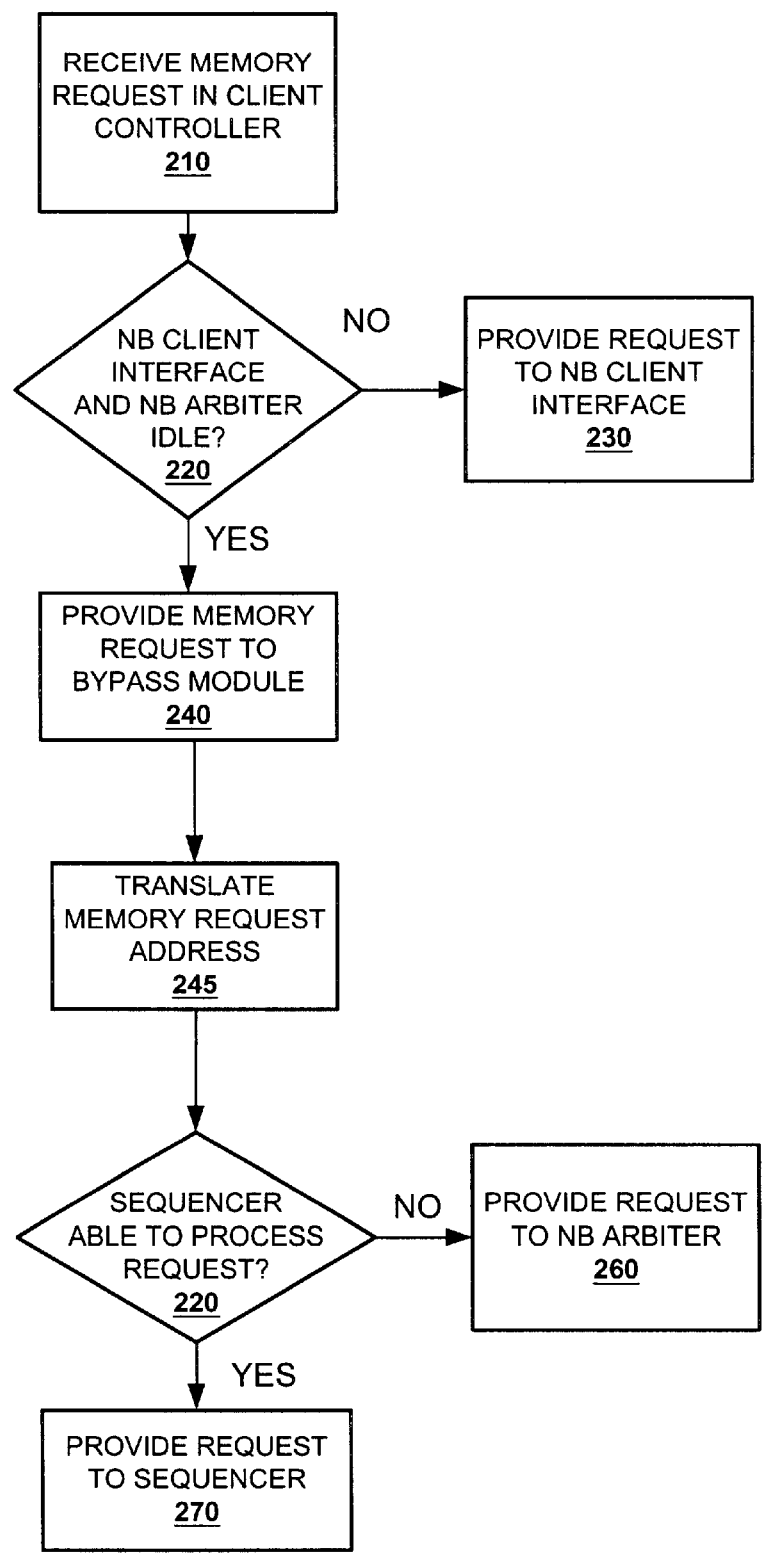
FIG. 2 is a flow diagram illustrating a method of processing memory controller requests, according to one embodiment of the present invention.

Referring now to FIG. 2, a flow diagram illustrating a method of bypass processing memory controller requests is shown, according to one embodiment of the present invention. A memory controller analyzes components for processing memory requests to determine if received memory requests need to be processed by any of the components. If components are unnecessary, the components are bypassed in processing the memory request, allowing latency associated with unnecessary handling within the memory controller-processing pipeline to be reduced.

In step 210, a memory read request is received. The memory request is generated by a memory client and received by a controller associated with the client. In one embodiment, the memory read request is a cache fetch request used to update data in cache memory with data in a main memory. The cache fetch request is received through a bus interface unit coupled to a memory controller. The bus interface unit is used to provide an interface between a system processor and system components, such as the memory controller.

In step 220, the memory controller determines if client interface and arbiter components, such as NB client interface 124 and NB arbiter 126 (FIG. 1), associated with the memory controller are idle. If the components are idle, they may be bypassed. The NB client interface and NB arbiter components are used for organizing and scheduling various received memory requests. If the NB client interface and NB arbiter components do not currently have any memory requests to process, there may be no need to send a single received memory request to them. Memory request queues associated with the NB client interface and NB arbiter components may be analyzed to determine if the NB client interface and NB arbiter are busy processing requests. In one embodiment, the status of the NB client interface and NB arbiter is provided to the client or a client interface, such as bus interface unit 110 (FIG. 1), allowing the client or client interface to determine whether to provide the memory request to the NB client interface for normal processing or to a bypass module, such as bypass module 122 (FIG. 1), to allow the memory controller to decide how to bypass the memory request.

If the NB client interface and NB arbiter components are not idle in step 220, the received request is provided to the NB client interface in step 230. Consequently of the memory request being provided to the NB client interface for normal processing in the memory controller. The NB client interface will translate the address of the memory request to an address associated with main memory and provide the memory request to the NB arbiter. The memory request will then be passed to a sequencer that in turn provides the memory request to main memory.

If the NB client interface and NB arbiter components are idle and do not have any pending memory requests to process, the memory request is provided to the bypass module of the memory controller in step 240. The bypass module monitors the components of the memory controller to determine an efficient place to provide the memory request. In step 245, the bypass module translates a virtual address provided by the memory request to match a physical memory address of main memory. In step 250, the bypass module determines if the memory request sequencer of the memory controller is able to process the memory request. In one embodiment, it is determined whether the memory request sequencer is currently busy processing memory controller requests or is idle. The bypass module may analyze a queue associated with the memory request sequencer to determine if the memory request sequencer has any pending requests, indicating the memory request sequencer is busy. The bypass module may also compare a table of open memory pages to determine if the memory request would require that any pages of main memory be opened. As the NB arbiter is generally used to open pages of main memory, the request may need to be processed by the NB arbiter before the memory request sequencer.

If the memory request sequencer is unable to process the memory request immediately in step 250, the memory request is provided to the NB arbiter in step 260. The NB arbiter may then generate any commands to open particular pages associated with the memory request and then provide the memory request to the top of the queue associated with the memory request sequencer. If the memory request sequencer is capable of processing the memory request in step 250, the memory request is provided to the memory request sequencer in step 270. In one embodiment, the memory request is provided to the bottom of the queue associated with the memory request sequencer. The memory request sequencer provides the memory request to main memory. Any data associated with the memory request is then provided to the client, through the memory controller.

Figure 3:
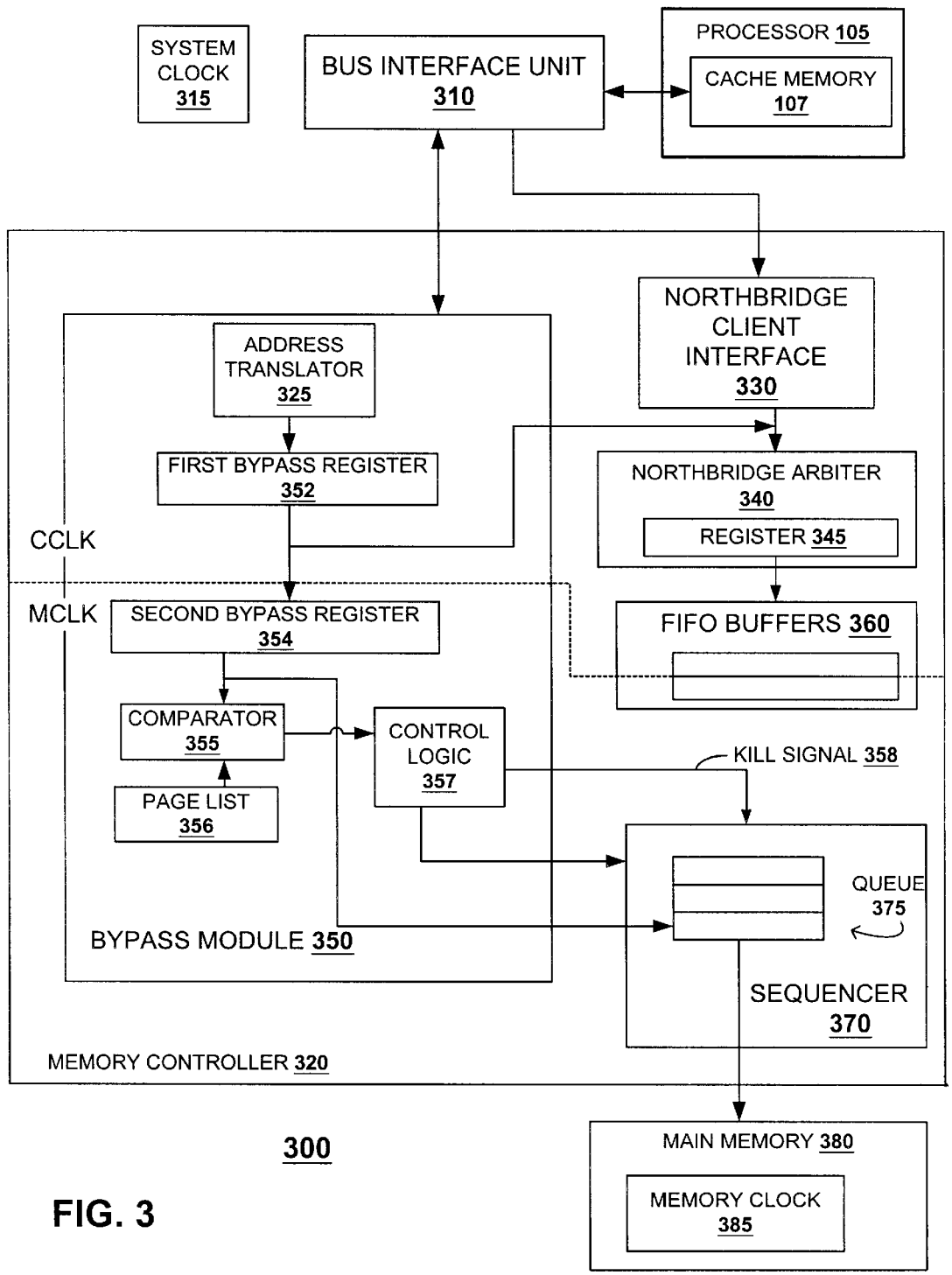
FIG. 3 is a block diagram illustrating a system for bypassing memory controller components in a system with asynchronous memory, according to one embodiment of the present invention.

Referring now to FIG. 3, a block diagram illustrating a system for bypassing memory controller components in a system with asynchronous memory is shown, and referenced generally as system 300 according to one embodiment of the present invention. System 300 includes system components under a first clock, system clock 315, and system components under a second clock, memory clock 385. In one embodiment of the present invention, processed for bus interface unit 310, and a first portion of memory controller 320 including address translator 325, first bypass register 352, NB client interface 330 and NB arbiter 340 are run at a first speed controlled by system clock 315. Processes for main memory 380, second bypass register 354, page hit comparator 355 and sequencer 370 are run at a speed controlled by memory clock 385. FIFO buffers 360 are used to transfer data between the portion of system 300 under the control of system clock 315 and the portion of system 300 under the control of memory clock 385. In contrast to system 100 (FIG. 1), system 300 is asynchronous due to the two clocks, system clock 315 and memory clock 385, used by various components.

Bus interface unit 310 receives memory requests related to cache memory 107 of processor 105. In one embodiment, bus interface unit 310 receives a bypass enable signal from a memory controller 320. The bypass enable signal indicates a current memory request of bus interface unit 310 is capable of bypassing components of memory controller 320. In one embodiment, a bypass module 350 of memory controller 320 generates the bypass enable signal based on activity of NB client interface 330. In one embodiment, NB client interface 330 is analyzed to determine if there are any pending requests within a queue (not shown) associated with NB client interface 330. If bypass module 350 detects NB client interface 330 is idle, bypass module 350 sends the bypass enable signal to bus interface unit 310. The activity of NB arbiter 340 may also be monitored to determine if bypassing should be enabled. If bus interface unit 310 receives a bypass enable signal, bus interface unit 310 provides any received memory request to NB client interface 330 of memory controller 320, wherein the memory request is processed normally. If bus interface unit 310 receives a bypass enable signal, bus interface unit 310 provides the memory request to bypass module 350.

An address translator of bypass module 350 is used to translate a virtual address provided by a memory client and a physical address of main memory 380. In one embodiment, the translated memory request is stored in a first bypass register 352. It should be noted that the bypass enable signal provided to bus interface unit 310 is indicative of a speculative bypass. While NB client interface 330 can be bypassed, the bus interface unit 310 is uncertain as to which of the other components of memory controller 320 may also be bypassed, such as memory requests and data placed in first in first out (FIFO) 360 for transfer from the first portion of memory controller 320 controlled by system clock 315 to the second portion of memory controller 320 controlled by memory clock 385 are not considered in determining the enabling of bypass processing.

In one embodiment, a list of open pages, page list 356, indicates pages of main memory 380 which have been opened by memory controller 320. While a list such as page list 356 may be used to determine whether or not to bypass NB client interface 330 in processing memory requests, there may be a command pending in FIFO buffers 360. The command may be used to open or close particular pages being requested. To allow a memory request to be handled despite any pending request, the memory request is sent to both NB arbiter 340 and the rest of a bypass pathway of bypass module 350. In one embodiment, a register of NB arbiter 340, NB arbiter register 345, is used to store and delay the memory request in NB arbiter 340. Accordingly, the copy of the memory request sent along the bypass pipeline is at least one cycle ahead of the copy of the memory request in NB arbiter 340. NB arbiter 340 passes the stored memory request to FIFO buffers 360, where the memory request is passed to sequencer 370. It should be noted that in one embodiment, a list of open pages, such as page list 356 may need to be updated occasionally to match open pages known by sequencer 370. Alternatively, page list 356 may be directly linked to the list of pages known by sequencer 370.

The copy of the memory request, which is passed through the bypass pipeline, is passed to second bypass register 354. In one embodiment, a comparator 355 compares page list 356 to pages requested in the memory request stored in second bypass register 354. If a match in page list 356 is found for pages listed in the memory request, the memory request stored in second bypass register 354 is accepted for bypass processing. The memory request stored in second bypass register 354 may then be passed to sequencer 370. In one embodiment, the memory request is provided to a final portion of a memory request queue 375 in sequencer 370. In one embodiment, the sequencer 370 does not accept the memory request until a control signal is provided by control logic 357. Sequencer 370 may also be analyzed to determine if it is currently busy processing pending memory requests. In one embodiment, read and write pointers to queue 375 are used to determine if any pending memory requests are present.

In one embodiment, comparator 355 sends a signal to a set of components, control logic 357. Control logic 357 represents components to generate a signal for sequencer 370 to allow the memory request to be accepted. Control logic 357 may also be used to stall requests in queue 375 of sequencer 370, allowing the memory request to be processed. In one embodiment, if the memory request is accepted, the copy of the memory request passed by NB arbiter 340 is terminated once sequencer 370 has received the memory request. The memory request from NB arbiter 340 may also be stalled to determine whether or not the memory request from bypass module 350 is to be accepted.

In one embodiment, once the copy of the memory request is received by second bypass register 354, a bypass enable signal is sent to bus interface unit 310 to allow a new request to be sent. Control logic 357 may be used to stall the bypass processing of a new memory request if sequencer 370 is still processing an old memory request.

Figure 4:
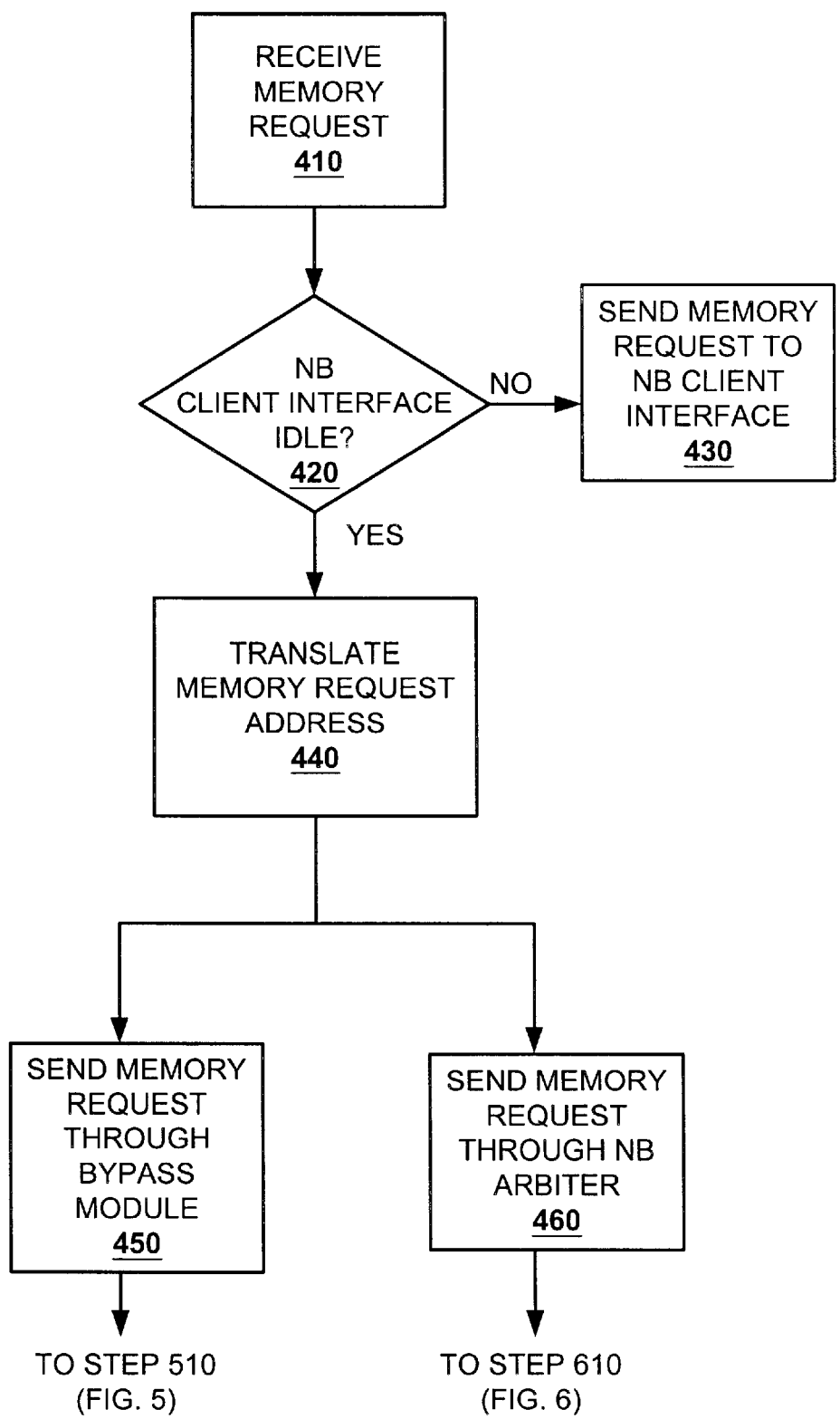
FIGS. 4 and 5 are portions of a flow diagram illustrating a method for bypassing memory controller components in a system with asynchronous memory components, according to one embodiment of the present invention.
Figure 5:
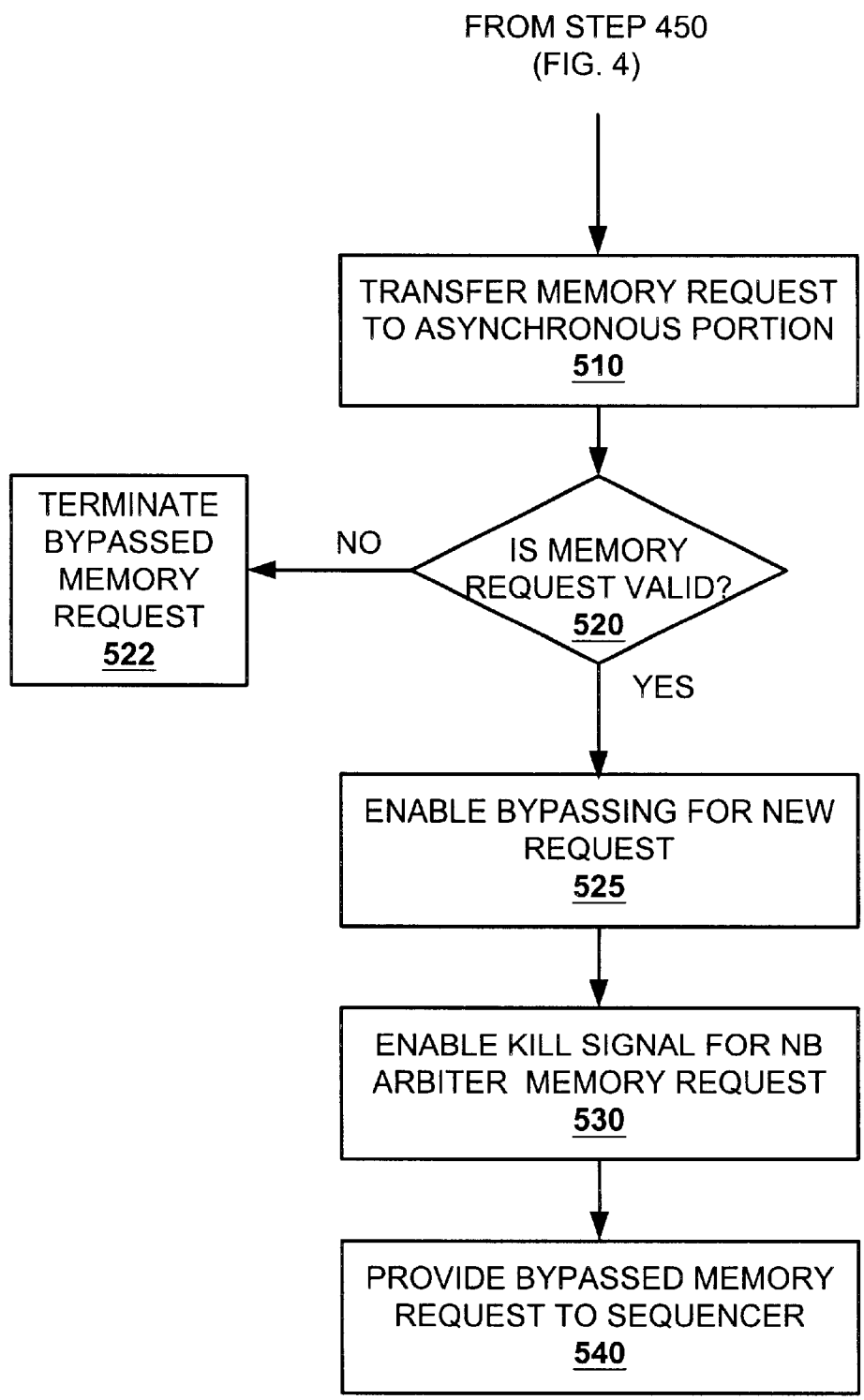

Referring now to FIGS. 4 and 5, portions of a flow diagram illustrating a method for bypassing memory controller components in a system with asynchronous memory components are shown, according to one embodiment of the present invention. A system with a first set of components synchronized to a system clock is used to pass memory requests to a second set of components and memory, which is controlled using a memory clock. The memory requests may bypass particular memory controller components to be processed in less time than memory components that are processed through all the memory controller components. In contrast to the steps described in reference to FIG. 2, the steps described in reference to FIGS. 4 and 5 must handle difficulties which arise due a memory controller with components using different clock references, a system clock and a memory clock.

In step 410, a bus interface unit, using the system clock, receives a memory request. In one embodiment, the memory request is a cache fetch request used to read data from main memory for updating cache memory associated with a processor. Alternatively, a hardware client or a software application client may generate the memory request. In such a case, the request may be received through a bus controller, such as a PCI bus controller.

In step 420, a memory controller determines if a NB client interface of the memory controller is idle. In one embodiment, the idleness of the NB client is determined by checking if any pending requests are stored in queues associated with the NB client interface. In one embodiment, pointers to write and read portions of the queue are compared to see if they are equal. If the pointers are equal, the queue is empty. If the NB client interface is currently processing memory requests, the memory request cannot be bypassed and is passed to the NB client interface in step 430. The memory request is then processed through a normal path of the memory controller.

In step 420, if the NB client interface is idle, a virtual memory address provided by the memory component is translated to a physical memory address in step 440. One of the functions of the NB client interface is generally to translate the virtual address provided by the memory request. However, since the NB client interface is bypassed, the address is translated external to the NB client interface. In step 450, the memory request is provided to a set of components of a bypass module to provide the memory request to a memory request sequencer. In step 510 the memory request is transferred to components of the memory controller using the memory clock. Concurrently with step 450, a copy of the memory request is also provided to a NB arbiter of the memory controller, as described further in reference to FIG. 6.

In step 520, it is determined if the memory request sent through the bypass module components is valid for processing in the memory controller sequencer. In one embodiment, a list of open pages of main memory is compared to a page of memory requested by the memory request. If the data of the memory request is in an address supported by the list of open pages, the memory request is considered valid. A queue of the memory request sequencer may also be checked to see if the memory request sequencer is already busy processing other requests. If the memory request sequencer is busy, the memory request is considered invalid. If the memory request is considered invalid, the memory request is terminated in step 522. If the memory request is valid, a signal is generated to allow memory clients to bypass a new memory request through the bypass module. In step 530 a kill signal is generated to terminate the copy of the memory request sent through a NB arbiter of the memory controller.

In step 540, the copy of the memory request in the bypass module is provided to a portion of the memory request sequencer. In one embodiment, the memory request is provided to a final portion of a memory request queue of the memory request sequencer. The memory request may then be provided to main memory. The memory controller passes any data returned from main memory to the client that generated the memory request.

Figure 6:
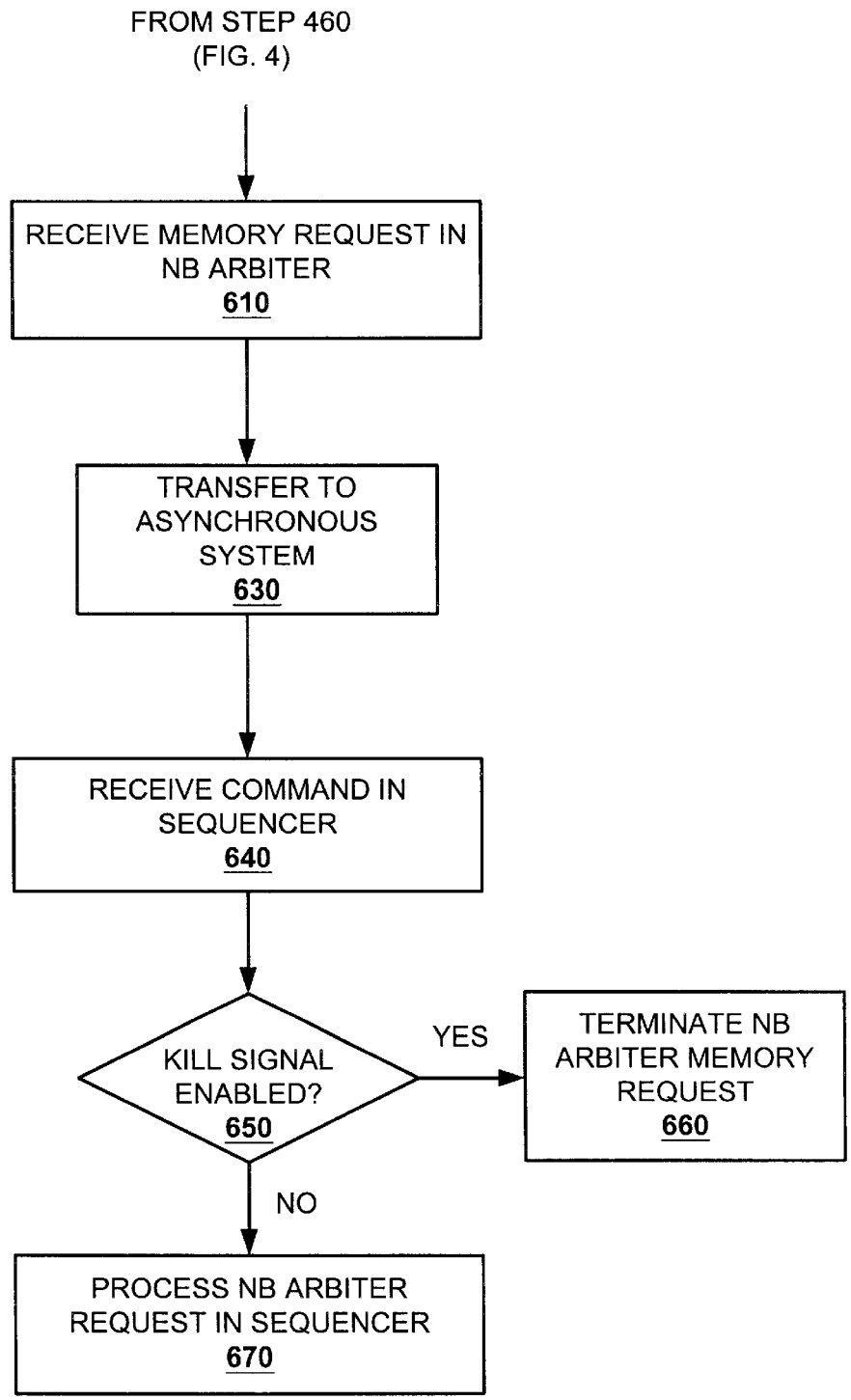
FIG. 6 is a flow diagram illustrating a method of processing a copy of a memory request bypassed to a Northbridge arbiter in a system with asynchronous memory, according to one embodiment of the present invention.

Referring now to FIG. 6, a flow diagram illustrating steps for processing a copy of the memory request received by a NB arbiter of the memory controller is shown, according to one embodiment of the present invention. Memory requests bypassed through a memory controller in an asynchronous system are not assured that the memory requests can be bypassed to a memory request sequencer of the memory controller, as described in FIGS. 4 and 5. Memory commands pending in FIFO buffers used to transfer data across asynchronous portions of the memory controller may close memory pages used to process the memory request. In case the memory request cannot be bypass processed, a copy of the memory request is provided to the NB arbiter of the memory controller.

In step 610, a copy of the memory request provided by a bypass module in step 460 (FIG. 4) is received by the NB arbiter of the memory controller. In step 620, the memory request is delayed by at least one system clock cycle. In one embodiment, the memory request is stored in a controlled register. The value of the memory request is not output from the controlled register until the next cycle of the system clock used by the NB arbiter. In one embodiment, the NB arbiter generates commands to open pages of main memory associated with the memory request. In one embodiment, the NB arbiter includes a list of currently opened pages and generates commands only for pages that are not currently open, allowing the NB arbiter to decide which pages of memory must be opened.

In step 630, the memory request and any associated memory commands are transferred to a portion of the memory controller using a memory clock for reference. In one embodiment, the memory request and any associated data are transferred using a FIFO buffer. Data is stored into the FIFO buffer using the system clock and read from the FIFO buffer using the memory clock. It should be noted that a delay associated with the transfer of the memory request in step 630 should match a delay in the transfer of a bypassed memory request in step 510 (FIG. 5). In step 640, the memory request and any associated commands are stored in a memory request sequencer. In one embodiment, data stored in the sequencer from the NB arbiter is stored in a topmost portion of a memory request queue.

In step 650, it is determined if a kill signal for the memory request is enabled. The kill signal generated by the bypass module in step 530 (FIG. 5) is used to terminate the memory request processed through the NB arbiter to ensure the same request is not processed twice. If the kill signal is enabled, the memory request and any associated memory commands are terminated in step 660. The memory request and commands are removed from the memory request queue provided by the memory request sequencer. If the memory request is not enabled, the memory request is processed through the memory request sequencer and provided to main memory in step 670. Any data returned by main memory is processed back to a client that generated the memory request.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. While the present invention has been described as providing a speculative bypass signal to a client for an initial decision to attempt to bypass a first memory controller component, it should be appreciated that in other embodiments of the present invention the decision to initially bypass the first component may be made within the memory controller. It should be appreciated that the system described herein has the advantage of providing improved efficiency in bypass processing of memory requests.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising the steps of:
   providing, to a client, a signal indicating a state of a memory controller pipeline;
   receiving a memory access request from the client, the memory access request to obtain data from a page of memory by bypassing a portion of the memory controller pipeline;
   determining, after receiving the memory access request from the client, if the page of memory is open; and
   delivering the memory access request to a later portion of the memory controller pipeline, wherein an earlier portion of the memory controller pipeline, used to process the memory access request before the later portion, is bypassed.

2. The method as in claim 1, wherein the step of delivering includes delivering the memory access request to a Northbridge arbiter when the page of memory is not open.

3. The method as in claim 1, wherein the step of delivering includes delivering the memory access request to a sequencer when the page of memory is open.

4. The method as in claim 1, wherein the memory access request is a cache fetch request.

5. The method as in claim 1, wherein the step of providing, to the client, the signal indicating the state of the memory controller includes providing a signal indicating a level of idleness associated with the memory controller pipeline.

6. The method as in claim 5, wherein determining a level of idleness associated with the memory controller pipeline includes analyzing memory request queues of a first component and a second component are empty.

7. The method as in claim 1, wherein the portion of the memory controller pipeline includes a Northbridge client interface.

8. The method as in claim 1, wherein the step of delivering the memory access request to a later portion of the memory controller pipeline includes translating a virtual address associated with the first memory address to a physical address associated with the memory before delivering the memory access request.

9. The method as in claim 1, wherein determining if the page of memory is open includes comparing a list of memory pages currently open and a page of memory to be addressed by the memory access request.

10. The method as in claim 1, wherein the later portion of the memory controller pipeline includes a later portion of a sequencer.

11. A method comprising the steps of:
    receiving a first memory request to read data from memory at a receiving portion of a first set of components synchronous to a first clock;
    receiving a bypass enable signal at the receiving portion, wherein the bypass enable signal is based on a set of known open memory pages;
    providing the first memory request to a bypass module, in a second set of components synchronous to a second clock, and to an arbitration portion of a normal access path in the first set of components, wherein the first request is processed in the arbitration portion concurrently to processing in the bypass module;
    determining, in the second set of components, if the first memory request is valid; and
    enabling the first memory request to be accessed by bypassing sequencer stages in the second set of components.

12. The method as in claim 11, wherein the first memory request includes a cache request.

13. The method as in claim 11, wherein the second clock includes a memory clock.

14. The method as in claim 11, wherein the arbitration portion is used to generate commands to open pages of memory.

15. The method as in claim 11, wherein the step of determining if the first memory request is valid includes comparing a set of open pages associated with the memory to a page addressed by the first memory request.

16. The method as in claim 11, wherein bypassing sequencer stages includes providing the first memory request to a final portion of a queue associated with a memory request sequencer.

17. The method as in claim 11, further including the steps of providing the first memory request to a buffer using the system clock, and reading the first memory request from the buffer using the memory clock to transfer the first memory request to the second set of components.

18. A method comprising the steps of:
    providing a control signal from a first set of components synchronous to a first clock to a second set of components synchronous to a second clock, wherein the control signal indicates to the second set of components to pass a memory access request to the first set of components;
    receiving the memory access request, from the second set of components;
    determining, in the first set of components, if the memory access request is valid for processing in a memory sequencer stage; and
    allowing, in the second set of components, the memory access request to bypass a normal operating path, wherein the bypass is performed to process the memory access request in the memory sequencer stage.

19. The method as in claim 18, wherein the memory access request is to read data from memory.

20. The method as in claim 18, wherein the first clock is a memory clock.

21. The method as in claim 18, wherein the second clock is a system clock.

22. The method as in claim 18, wherein the memory request is a cache fetch request.

23. The method as in claim 18, wherein the step of determining if the first memory request is valid includes comparing a list of open memory pages to a page addressed through the first memory request.

24. The method as in claim 18, wherein the memory sequencer stage includes a final portion of a queue associated with a memory request sequencer.

25. The method as in claim 18, wherein the normal operating path includes processing the first memory request through a Northbridge client interface, a Northbridge arbiter and a memory request sequencer.

26. The method as in claim 18, further including the step of providing a control signal to cancel a copy of the memory request processed through at least a portion of the normal operating path.

27. The method as in claim 26, wherein the at least a portion of the normal operating path includes a Northbridge arbiter and a memory request sequencer.

28. A system comprising:
a client interface to:
receive a memory access request to access data from memory, wherein the memory access request is provided by a memory client;
receive a signal indicating an activity of a first component of a memory controller;
provide the memory access request to the first component when the signal indicates the first memory component is busy;
providing the memory access request to a bypass module when the signal indicates the first component is idle;
said memory controller including:
said first component to:
organize the memory access request with pending memory requests;
provide the memory request to a second component;
a second component to:
arbitrate the memory access request with pending memory requests;
provide the memory access request to a memory request sequencer;
a memory request sequencer to queue memory requests to memory;
a bypass module to:
identify activity associated with the first component, the second component, and the memory request sequencer;
provide the signal indicating the activity of the first component to the client interface;
receive the memory access request from the client interface;
determine whether the memory access request is valid for processing in the memory request sequencer;
providing the memory access request to the second component when the memory access request is valid;
providing the memory access request to the second component when the memory access request is valid; and
a memory to provide data associated with the memory access request.

29. The system as in claim 28, wherein the client interface includes a bus interface unit and the memory request includes a cache fetch request.

30. The system as in claim 28, wherein the activity of the first component is determined by determining a number of pending requests in the first component.

31. The system as in claim 28, wherein the signal indicating the activity of the first component further indicates the activity of the second component.

32. The system as in claim 28, wherein the second component is further used to generate commands to open pages of the memory associated with the memory access request.

33. The system as in claim 28, wherein the memory request sequencer includes a request queue with a final portion to provide the memory access request to the memory, wherein the memory access request, as provided by the bypass module, is received in the final portion of the memory request queue.

34. The system as in claim 28, wherein the bypass module determines the validity of the memory access request by comparing a set of open pages of the memory to a page addressed by the memory access request.

35. The system as in claim 28, further including:
a system clock for synchronizing processes of the memory client controller and at least a first portion of the memory controller; and
a memory clock for synchronizing functions of the memory and at least a second portion of the memory controller.

36. The system as in claim 35, wherein the at least a first portion of the memory controller includes the first component, the second component and at least a first portion of the bypass module and the at least a second portion of the memory controller includes the memory request sequencer and at least a second portion of the bypass module.

37. The system as in claim 35, wherein the at least a first portion of the bypass module includes components to receive the memory access request from the memory client controller and the second portion of the bypass module includes components for providing the memory access request to the memory request sequencer.

38. The system as in claim 35, wherein the bypass module is further used to provide a copy of the memory access request to the second component for processing concurrent to the bypass module providing the memory access request to the memory request sequencer.

39. The system as in claim 38, wherein the memory request sequencer receives the copy of the memory access request from the second component and the bypass module provides a signal to the memory request sequencer indicating to cancel the copy of the memory access request.

* * * * *